(12) United States Patent
Ko et al.

(10) Patent No.: US 8,461,263 B2
(45) Date of Patent: Jun. 11, 2013

(54) END-MODIFIED DIENE COPOLYMER HAVING GOOD COMPATIBILITY WITH REINFORCING SILICA AND PREPARATION METHOD THEREOF

(75) Inventors: Jae Young Ko, Daejeon (KR); Dae Hyung Lee, Daejeon (KR); Cheol Min Park, Gwangju (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 71 days.

(21) Appl. No.: 13/277,243

(22) Filed: Oct. 20, 2011

(65) Prior Publication Data

US 2013/0090427 A1 Apr. 11, 2013

(30) Foreign Application Priority Data

Oct. 7, 2011 (KR) ........................ 10-2011-0102284

(51) Int. Cl.
C08L 83/14 (2006.01)
(52) U.S. Cl.
USPC .......................................... 525/106; 524/588
(58) Field of Classification Search
USPC .......................................... 525/105; 524/588
See application file for complete search history.

(56) References Cited

U.S. PATENT DOCUMENTS

| | | | |
|---|---|---|---|
| 4,555,548 A | 11/1985 | Ueda et al. | |
| 4,618,650 A * | 10/1986 | Halasa et al. | 525/105 |
| 5,811,479 A * | 9/1998 | Labauze | 524/188 |
| 6,013,718 A * | 1/2000 | Cabioch et al. | 524/506 |
| 6,133,388 A | 10/2000 | Lee et al. | |
| 6,329,467 B1 | 12/2001 | Halasa et al. | |
| 6,566,480 B2 * | 5/2003 | Ko et al. | 528/42 |
| 6,846,873 B2 * | 1/2005 | Ko et al. | 524/492 |
| 7,858,690 B2 * | 12/2010 | Chen | 524/492 |
| 2004/0127645 A1 * | 7/2004 | Ko et al. | 525/106 |
| 2005/0176886 A1 * | 8/2005 | Jang et al. | 525/63 |
| 2007/0299197 A1 * | 12/2007 | Lin et al. | 524/543 |
| 2008/0097024 A1 * | 4/2008 | Chen | 524/588 |
| 2011/0082253 A1 * | 4/2011 | Thiele et al. | 524/572 |

FOREIGN PATENT DOCUMENTS

| | | |
|---|---|---|
| KR | 10-1993-0001346 | 2/1993 |
| KR | 10-1993-0001347 | 2/1993 |
| KR | 10-1995-0704405 | 11/1995 |

* cited by examiner

*Primary Examiner* — Margaret Moore
(74) *Attorney, Agent, or Firm* — Frommer Lawrence & Haug LLP; Ronald R. Santucci

(57) ABSTRACT

The present invention provides an end-modified diene copolymer having excellent compatibility with silica as a reinforcement material, and a preparation process thereof, in which the end-modified diene copolymer is prepared by preparing a living polymer of a conjugated diene monomer and/or a vinyl aromatic monomer, modifying the living polymer with a reactive organosiloxane compound, and then modifying the end of the living polymer, to which the organosiloxane compound has not been coupled, with an organosilane compound having various functional groups. When the end-modified diene copolymer is used as a rubber material in the manufacture of a silica tire, the dispersion of silica in the copolymer can be improved and the bonding strength between silica and the rubber can be significantly increased, thereby manufacturing a high-quality silica tire.

9 Claims, No Drawings

US 8,461,263 B2

END-MODIFIED DIENE COPOLYMER HAVING GOOD COMPATIBILITY WITH REINFORCING SILICA AND PREPARATION METHOD THEREOF

CROSS-REFERENCE TO RELATED APPLICATION

This application claims under 35 U.S.C. §119(a) the benefit of Korean Patent Application No. 10-2011-0102284 filed on Oct. 7, 2011, the entire contents of which are incorporated herein by reference.

BACKGROUND (a) Technical Field

The present invention relates to an end-modified diene copolymer having excellent compatibility with reinforcing silica and a preparation method thereof. More particularly, the present invention relates to an end-modified diene copolymer prepared by preparing a living polymer of a conjugated diene monomer and/or a vinyl aromatic monomer, modifying the living polymer with a reactive organosiloxane compound, and then modifying the end of the living polymer, to which the organosiloxane compound has not been coupled, with an organosilane compound having various functional groups, and to a method for preparing the end-modified diene copolymer.

(b) Background Art

A diene polymer is commonly used as a raw material for rubber. A typical example of this diene polymer may be a butadiene polymer or a styrene-butadiene copolymer.

The diene polymer is generally prepared by a solution polymerization process in the presence of an organolithium catalyst. The solution polymerization process has an advantage in that molecular structures such as the vinyl structure of conjugated diene, the styrene block percentage, etc. can be easily controlled, unlike a conventional emulsion polymerization process. The diene polymer prepared by the solution polymerization process has significantly excellent rolling resistance and wet traction compared to a styrene-butadiene rubber (SBR) prepared by the emulsion polymerization process, and thus is suitable as a rubber material for manufacturing tires. In the solution polymerization process that is carried out in the presence of an organolithium catalyst, various functional groups can be easily introduced into the molecular end to control cold flow at room temperature and to improve processability and bonding strength when the polymer is compounded with an inorganic reinforcing material such as silica, thus improving the dispersibility of the reinforcing material. Additionally, various kinds of functional groups can be introduced into a polymer to increase compatibility with an inorganic reinforcing material for tires, thus improving wear resistance, reducing rolling resistance and increasing wet traction.

Conventional solution polymerization techniques for increasing compatibility with carbon black or silica as an inorganic reinforcing material will now be explained.

First, in an attempt to develop a method for increasing the compatibility of rubber with carbon black, U.S. Pat. No. 4,555,548 discloses a method for modifying the ends of the molecule with an amine compound such as amino benzophenone in order to obtain excellent dynamic properties and mechanical properties compared to those of conventional rubbers. However, the rubber prepared by this method, when compounded with an inorganic reinforcing material, has poor processability, and the cold flow of the rubber, which is an important factor for storage stability, is high, thus causing a problem associated with long-term storage. Particularly, if this rubber is used to manufacture a tire containing reinforcing silica (hereinafter, referred to as "silica tire"), the mechanical properties and dynamic properties (e.g., rolling resistance and wet traction) of the tire will be deteriorated due to the low compatibility of the rubber with silica. Thus, there is a limit in the use of the rubber for the manufacture of silica tires.

U.S. Pat. No. 6,329,467 describes a method of using a mixture of tin tetrachloride and silicon tetrachloride as a coupling agent to improve the processability and rolling resistance of a carbon black-containing composition. However, because the polymer prepared by this method has no functional group inducing compatibility with a reinforcing material, it has low compatibility with the reinforcing material in a silica-containing composition, indicating that it is difficult to prepare a rubber suitable for silica tires using the polymer. Particularly, when tin tetrachloride is used, there is a problem in that the properties of the silica-containing composition are deteriorated, because the bond between tin and the polymer is dissociated by stearic acid which is used as a vulcanization accelerator.

U.S. Pat. No. 6,133,388 discloses a technique of maximizing compatibility with a reinforcing material by modifying both ends of a molecule with functional groups. However, the compound thus prepared has increased viscosity in a solution, which makes it difficult to actually commercialize the compound.

In attempts to increase compatibility with silica that is an inorganic reinforcing material, Korean Patent Application Publication Nos. 94-019797 and 94-019795 disclose dispersing polydimethylsiloxane in a styrene-based resin composition to significantly improve the wear resistance and cold impact resistance of the composition. However, the polymer complex prepared by dispersing polydimethylsiloxane has no covalent bond between the polydimethylsiloxane and the organic polymer resin, and thus is likely to undergo phase separation. Also, because the polydimethylsiloxane has no polar group or hydrophilic group, the polymer complex has low compatibility with an inorganic reinforcing material.

In the development of organic/inorganic composite materials, the modification of organic polymers that are highly reactive has been performed to enhance the compatibility between the organic and inorganic materials, and many studies on techniques for modifying such inorganic polymers have been conducted. For example, Korean Patent Application Publication No. 95-704405 discloses a technique of polymerizing hexamethylcyclotrisiloxane at the end of a living polymer block. In addition, it was reported that, in order to enhance the miscibility between organic and inorganic composite materials, the end of a living polymer was modified with ethylene oxide (J. Polym. Sci., Part A: Polym. Chem., 26, 2031 (1988)), diphenylethylene (J. Polym. Sci., Part A: Polym. Chem., 30, 2349 (1992)), N-(benzylidene)-trimethylsilylamine (Makromol. Chem., 184, 1355 (1983)) or the like; however, there is a limit to obtain sufficient compatibility with inorganic fillers.

As described above, there is a demand for the development of a novel diene polymer which overcomes the shortcomings of conventional diene polymers and has excellent compatibility with inorganic fillers, and thus is suitable as a material for tires.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an end-modified diene copolymer as a new material which has improved compatibility with silica that is receiving attention as a tire reinforcement material, and thus has improved processability when compounded with silica, thereby improving the physical properties of tires.

The present invention also provides a silica-containing tire composition comprising an end-modified diene copolymer as a rubber material.

In one aspect, the present invention provides an end-modified diene copolymer wherein a living polymer of either a conjugated diene monomer alone or a mixture of the conjugated diene monomer and a vinyl aromatic monomer is modified with an organosiloxane compound represented by the following formula 1 and with an organosilane compound represented by the following formula 2:

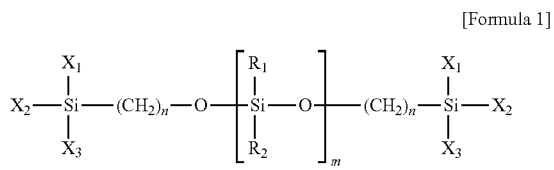

[Formula 1]

wherein $R_1$ and $R_2$ are the same or different and represent a hydrogen atom or a $C_1$-$C_{20}$ alkyl group; $X_1$, $X_2$ and $X_3$ are the same or different and represent a hydrogen atom, a $C_1$-$C_{20}$ alkyl group, or a reactive group capable of reacting with the end of the living polymer, the reactive group being a halogen atom, a $C_1$-$C_{20}$ alkoxy group, an epoxy group or an epoxy $C_1$-$C_{20}$ alkyl group; at least one of $X_1$, $X_2$ and $X_3$ is a reactive group; n is an integer between 1 and 1000, and preferably 1 and 20; and m is an integer between 0 and 20;

[Formula 2]

wherein $Y_1$, $Y_2$, $Y_3$ and $Y_4$ are the same or different and represent a $C_1$-$C_{20}$ alkyl group, a $C_1$-$C_{20}$ aminoalkyl group, $NH_2(CH_2)_p$—$NH(CH_2)_q$— wherein p and q are each an integer between 1 and 20, a $C_1$-$C_{20}$ alkylthio group, or a reactive group capable of reacting with the end of the living polymer, the reactive group being a chlorine atom, a $C_2$-$C_{20}$ alkenyl group, a $C_1$-$C_{20}$ alkoxy group, a $C_1$-$C_{20}$ haloalkyl group, an epoxy group, an epoxy $C_1$-$C_{20}$ alkyl group or an epoxy $C_1$-$C_{20}$ alkoxy group.

Other aspects and exemplary embodiments of the invention are discussed infra.

The above and other features of the invention are discussed infra.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The copolymer of the present invention is structurally characterized in that it has a backbone structure consisting of either a conjugated diene monomer alone or a mixture of the conjugated diene monomer and a vinyl aromatic monomer and is prepared by modifying the living polymer with the organosiloxane compound represented by formula 1 and with the organosilane compound represented by formula 2.

In the present invention, the organosiloxane compound represented by formula 1 and the organosilane compound represented by formula 2 are sequentially used to modify the living polymer. The reason therefor is as follows. The living polymer is subjected to a coupling reaction with the organosiloxane compound represented by formula 1, whereby the molecular weight of the polymer can be increased, so that the polymer can maintain excellent mechanical properties when compounded with silica, and at the same time, the compatibility of the polymer with silica is increased through the polysiloxane group existing in formula 1, a hydroxyl group produced by reaction with the living polymer, and an epoxy group remaining unreacted. Also, for the remaining portion of the living polymer, in which the modification and coupling reaction has not occurred, the end of the living polymer is modified with the compound represented by formula 2, whereby the compatibility of the polymer with silica is increased so that the wet traction and rolling resistance properties of a tire manufactured using the polymer are improved.

Because the polymer contains in its molecule a variety of functional groups having excellent compatibility with silica, for example, a polysiloxane group, a hydroxyl group, an epoxy group, an alkoxy group and the like, it has improved mechanical properties, dynamic properties, wear resistances and compounding processability when it is used as a rubber material for organic/inorganic composite materials containing silica as a reinforcement material.

Hereinafter, a method for preparing the end-modified diene copolymer according to the present invention will be described in detail.

The method for preparing the end-modified diene copolymer according to the present invention is carried out by a solution polymerization process in the presence of an organolithium catalyst. Specifically, the method of the present invention comprises the sequential steps of: (1) polymerizing either a conjugated diene monomer alone or a mixture of the conjugated diene monomer and a vinyl aromatic monomer in the presence of a hydrocarbon solvent, a Lewis case and an organolithium catalyst to obtain a living polymer; (2) allowing 1 mole of the living polymer to react with 0.01-0.5 mole of the organosiloxane compound represented by formula 1; and (3) allowing the end of the living polymer, to which the coupling agent organosiloxane compound has not been coupled, to react with the organosilane compound represented by formula 2 in an amount of 0.1-1 mole relative to 1 mole of the living polymer.

Each step of the method for preparing the end-modified diene copolymer according to the present invention will now be described in further detail.

Step (1) of the preparation method according to the present invention is a step of preparing the living polymer. The step of preparing the living polymer is carried out by conventional solution polymerization in the presence of an organolithium catalyst, and there is no particular limitation on the process of preparing the living polymer in the present invention. Specifically, step (1) is carried out in the presence of a hydrocarbon solvent, a Lewis base and an organolithium catalyst, and a conjugated diene monomer alone or a mixture of the conjugated diene monomer or a vinyl aromatic monomer may be used to prepare the living polymer.

Typical examples of the conjugated diene monomer that is used to prepare the living polymer in step (1) include butadiene or isoprene compounds. Specifically, it may be 1,3-butadiene or isoprene. Typical examples of the vinyl aromatic monomer that may be used in the present invention include styrenes or alpha-methyl styrenes. Specifically, the vinyl aromatic monomer may be styrene or alpha-methyl styrene. When the mixture of the conjugated diene monomer and the vinyl aromatic monomer is used as the monomer for preparing the living polymer, the mixing ratio of conjugated diene monomer: vinyl aromatic monomer is preferably in the range of 55-95: 5-45 wt %. if the amount of vinyl aromatic monomer used is less than 5 wt %, it will be difficult to improve the mechanical properties of the polymer, and if it is used in an amount of more than 45 wt %, the heat generation of a tire manufactured using the polymer will increase during the use of the tire, making it difficult to sufficiently improve fuel economy.

The organolithium catalyst that is used in the preparation of the living polymer in step 1 may be a hydrocarbon having one or more lithium atoms bonded thereto. Specifically, ethyl lithium, propyl lithium, n-butyl lithium, sec-butyl lithium, tert-butyl lithium, phenyl lithium, propenyl lithium, hexyl lithium, 1,4-dilithio-n-butane, 1,3-di(2-lithio-2-hexyl)benzene and the like may be used alone or in a mixture of two or more thereof. Particularly preferably, n-butyl lithium or sec-butyl lithium may be used. The amount of organolithium catalyst used may vary depending on the desired molecular weight of the polymer product, but is generally used in an amount of 0.1-5 mmol, and preferably 0.3-3 mmol, relative to 100 g of the monomer.

Examples of the hydrocarbon solvent that is used in the preparation of the living polymer in step 1 include n-hexane, n-heptane, iso-octane, cyclohexane, methylcyclopentane, benzene and toluene, with the preferred being n-hexane, n-heptane and cyclohexane, which may be used alone or in combination. The hydrocarbon solvent is used in such an amount that the concentration of the monomer is maintained at 5-40 wt %, and preferably 10-25 wt %. If the amount of solvent used is excessively large such that the concentration of the monomer is less than 5 wt %, the production yield of the polymer will decrease, resulting in an increase in the production cost, and if the solvent is used in a small amount such that the concentration of the monomer is more than 40 wt %, it will not be easy to control the viscosity of the solution and the heat of the reaction.

In step 1 of preparing the living polymer, the polymerization of the monomer is initiated using a Lewis base together with the organolithium compound. Examples of the Lewis base compound that is used to control the microstructure of the polymer include conventional Lewis bases, such as tetrahydrofuran, N,N,N,N-tetramethylethylenediamine (TMEDA), di-n-propyl ether, di-isopropyl ether, di-n-butyl ether, ethyl butyl ether, triethylene glycol, 1,2-dimethoxybenzene, trimethylamine, triethylamine, and ditetrahydrofurylpropane, with the preferred being ditetrahydrofurylpropane, tetrahydrofuran, and N,N,N,N-tetramethylethylenediamine. The Lewis base may be used in a suitable amount to obtain the random structure of the monomer and the content of the vinyl structure.

The temperature of initiation of the polymerization is typically in the range of about 0 to 60° C., and preferably 5-50° C. If the temperature of initiation of the polymerization is below 0° C., the viscosity of the solution will rapidly increase as the reaction progresses, thus making it difficult to ensure a smooth reaction and significantly reducing the reaction rate to make the polymerization process uneconomical. On the other hand, if the temperature of initiation of the polymerization is higher than 60° C., the reaction temperature will rapidly increase, making it not easy to control the reaction temperature. The reaction pressure is preferably maintained in the range of 1 to 10 kgf/cm$^2$. Because the polymerization reaction generally occurs for a sufficient time until the monomer is completely converted into the copolymer, it is preferably carried out until the high rate of conversion of the monomer is achieved. The reaction time is preferably maintained in the range of 20 minutes to 200 minutes.

Next, at the point of time when the solution polymerization reaction is completed, the organosiloxane compound represented by formula 1 is added to the polymer to perform a primary modification reaction. Then, the organosilane compound represented by formula 2 is added to the polymer to perform a secondary modification reaction, so that the active end of the living polymer is completely modified.

Step (2) of the preparation method of the present invention is a step of allowing the prepared living polymer to react with the organosiloxane compound. The organosiloxane compound is represented by formula 1 above. Specifically, the organosiloxane compound may be one or more selected from the group consisting of α,ω-bis(epoxyethyl)polydimethylsiloxane, α,ω-bis(2-dimethylchlorosilylethyl)polydimethylsiloxane, α,ω-bis(2-trichlorosilylethyl)polydimethylsiloxane, α,ω-bis(2-dichloromethylsilylethyl)polydimethylsiloxane, α,ω-bis(2-dimethylepoxysilylethyl)polydimethylsiloxane, α,ω-bis(2-methyldiepoxysilylethyl)polydimethylsiloxane, α,ω-bis(2-triepoxysilylethyl)polydimethylsiloxane, α,ω-bis(2-methyldimethoxysilylethyl)polydimethylsiloxane, α,ω-bis(2-dimethylmethoxysilylethyl)polydimethylsiloxane, α,ω-bis(2-trimethoxysilylethyl)polydimethylsiloxane, etc.

Herein, the organosiloxane compound represented by formula 1 which is used as the primary modifying agent is preferably used in an amount of 0.01-0.5 mole relative to 1 mole of the living polymer. If the organosiloxane compound is used in an amount of less than 0.01 mole, the effect thereof on the modification of the living polymer cannot be expected, and if it is used in an amount of more than 0.5 moles, the rate of coupling of the organosilane compound represented by formula 2 which is used in the subsequence process will be low, and thus the effect of modifying the end of the living polymer cannot be expected. The temperature of the primary modification reaction with the organosiloxane compound is maintained in the range of 30 to 200° C., and preferably 50 to 110° C. If the temperature of the modification reaction is lower than 30° C., the viscosity of the reaction material will increase as the reaction progresses, and the reactivity will decrease, resulting in an increase in the reaction time, and if the temperature of the modification reaction is higher than 200° C., the living polymer itself can undergo a coupling reaction, and thus the living polymer cannot react with the organosiloxane compound.

Step (3) of the preparation method according to the present invention is a step of further modifying the living polymer, which has been modified with the organosiloxane compound, with the organosilane compound. Specifically, step (3) is a step of allowing the end of the living polymer, to which the organosiloxane compound has not been coupled by the modification reaction in step 2, to react with the same molar amount of a modifying agent consisting of the organosilane compound so as to modify the end of the living polymer, thereby maximizing the compatibility of the living polymer with silica. The organosilane compound is represented by formula 2 above, and specific examples thereof include 3-chloropropyltriethoxysilane, 3-chloropropylmethylethoxysilane, 3-aminopropyltriethoxysilane, N-(2-aminoethyl)-3-aminopropyltrimethoxysilane, 3-aminopropylmethyldiethoxysilane, trimethoxysilylpropanethiol, 3-glycidyloxypropyl methyldiethoxysilane, 3-glycidyloxypropyl triethoxysilane, 3-glycidyloxypropyl methyldimethoxysilane, 3-glycidyloxypropyl trimethoxysilane, and vinyl triethoxysilane. Unlike the organosiloxane compound represented by formula 1 which is subjected to the coupling reaction, the organosilane compound represented by formula 2 reacts with anions at the end of the living polymer so that an epoxy group, an alkoxy group and a hydroxyl group can be introduced into the end of the living polymer. The organosilane compound represented by formula 1 is used in an amount of 0.1-1 mole, and preferably 0.8-1 mole, relative to 1 mole of the initial living polymer. If the amount of organosilane compound is less than 0.1 mole, the living polymer can undergo a coupling reaction so that the effect of the organosilane compound on the modification of the end of the living polymer cannot be expected. The secondary modification reaction with the organosilane compound is carried out after completion of the primary modification reaction following the initial polymerization reaction. The temperature of the secondary modification reaction is maintained in the range of 30 to 200° C., and preferably 50 to 110° C. If the temperature of the secondary modification reaction is lower than 30° C., the reactivity can be reduced, making it difficult to ensure a smooth reaction, and if the temperature is higher than 200° C., the living polymer itself can undergo a coupling reaction, and thus the living polymer cannot react with the organosilane compound.

The end-modified diene copolymer prepared by the above-described preparation method was measured for Mooney viscosity using a Mooney viscometer. Also, the microstructure of the conjugated diene compound, the composition ratio of the conjugated diene compound and the aromatic vinyl compound, the random and block percentages of the conjugated diene compound and the aromatic vinyl compound were analyzed by nuclear magnetic resonance (NMR). In addition, coupling number (CN), coupling efficiency (CE), molecular weight (MW) and molecular weight distribution (MWD) were analyzed by gel permeation ghromatography (GPC).

As a result, the end-modified diene copolymer had a Mooney viscosity [$ML_{1+4}$, 100° C.] of 20-200, and preferably 30-160. The results of GPC analysis revealed that, in the end-modified diene copolymer of the present invention, the ratio of modification with the organosiloxane represented by formula 1 was 1-50 mol %, and preferably 1-30 mol %, based on the moles of the living polymer, and the ratio of modification with the organosilane represented by formula 2 was 50-99 mol %, and preferably 60-90 mol %, based on the moles of the living polymer.

In another aspect, the present invention provides a silica-containing tire composition comprising the end-modified diene copolymer as a rubber material. The silica-containing tire composition generally comprises, based on 100 parts by weight of the rubber material, 10-100 parts by weight of reinforcing silica, 0.1-5 parts by weight of sulfur, and 0.1-5 parts by weight of a vulcanization accelerator. In addition, the tire composition may comprise conventional additives or other rubber materials which are used in the tire production field, and the use of such other components will be obvious to a person skilled in the art.

The silica-containing tire composition also comprises the end-modified diene copolymer as the rubber material, and thus can satisfy physical properties required for a silica tire.

Hereinafter, the present invention as described above will be described in further detail with reference to examples, but the scope of the present invention is not limited thereto.

EXAMPLES

Example 1

168 g of styrene, 420 g of 1,3-butadiene and 3,600 g of cyclohexane were added to a 10-L stainless reactor, and then 54 g of tetrahydrofuran was added to the reactor. Following this, the internal temperature of the reactor was controlled to 35° C. with stirring. Once the reactor temperature reached the set temperature, 5.0 mmol of n-butyllithium was added to the reactor to perform an adiabetic warming reaction. The degree of polymerization was determined by observing a change in the reaction temperature, and a small amount of the reaction mixture was taken at any time during the reaction to analyze the ratio and conversion rate of the monomer.

When the reaction temperature reached the maximum temperature, 12 g of additional 1,3-butadiene was added to the reactor in order to substitute the end of the reaction product with butadiene. After completion of the addition of the additional butadiene, 0.25 mmol of α,ω-bis(epoxyethyl)polydimethylsiloxane as a coupling agent was added to the reactor, and the reaction mixture was allowed to stand for a predetermined time to perform a coupling reaction. After completion of the coupling reaction, 4.5 mmol of 3-glycidyloxypropyl methyldimethoxysilane was added to the reactor to modify the active end of the polymer molecule with 3-glycidyloxypropyl methyldimethoxysilane, and the mixture was allowed to stand for a predetermined time. Then, 3 g of butylated hydroxy toluene (BHT) as an antioxidant was added to the reactor in an amount of 0.5 parts by weight based on 100 parts by weight of the rubber to terminate the reaction. The resulting polymer was stirred in steamed water to remove the solvent, and then roll-dried to remove the remaining solvent and water.

The microstructure of the prepared copolymer molecule was analyzed by NMR. In order to determine the ratio of modification with the organosiloxane compound represented by formula 1, a small amount of a sample was taken and analyzed by GPC after a sufficient reaction with the organosiloxane compound before the addition of the organosilane compound represented by formula 2. In addition, the ratio of modification with the organosilane compound represented by formula 2 was measured by taking a sample after the completion of the reaction and determining the adsorption of the modified component onto a column packed with silica gel. The difference between the GPC analysis result obtained using the polystyrene gel-containing column and the GPC analysis result obtained using the silica gel column was used to calculate the amount of adsorption onto the silica gel column, and the difference corresponding to the portion modified with the organosiloxane compound represented by formula 1 was calculated, thereby determining the ratios of modification. The ratios of modification were analyzed by GPC, the molecular weight and molecular weight distribution of the copolymer were also analyzed by GPC, and the dynamic properties of the copolymer rubber were analyzed by DMTA. The results of the analysis are shown in Table 1 below.

Example 2

A copolymer was prepared in the same manner as Example 1, except that 4.5 mmol of N-(2-aminoethyl)-3-aminopropyl trimethoxysilane was used in place of 3-glycidyloxypropyl methyldimethoxysilane as the organosilane compound (which is an end-modifying agent). After completion of the reaction, the polymer was treated in the same manner as Example 1. The results of the analysis of the polymer are shown in Table 1 below.

Example 3

A copolymer was prepared in the same manner as Example 1, except that 4.5 mmol of trimethoxysilylpropanethiol was used in place of 3-glycidyloxypropyl methyldimethoxysilane as the organosilane compound (which is an end-modifying agent). After completion of the reaction, the polymer was treated in the same manner as Example 1. The results of the analysis of the polymer are shown in Table 1 below.

Example 4

A copolymer was prepared in the same manner as Example 1, except that 4.5 mmol of vinyl triethoxysilane was used in place of 3-glycidyloxypropyl methyldimethoxysilane as the organosilane compound (which is an end-modifying agent). After completion of the reaction, the polymer was treated in the same manner as Example 1. The results of the analysis of the polymer are shown in Table 1 below.

Example 5

A copolymer was prepared in the same manner as Example 1, except that 0.1 mmol of α,ω-bis(2-trichlorosilylethyl)polydimethylsiloxane was used in place of α,ω-bis(epoxyethyl) polydimethylsiloxane as the organosiloxane compound (which is a coupling agent). After completion of the reaction, the polymer was treated in the same manner as Example 1. The results of the analysis of the polymer are shown in Table 1 below.

Example 6

A copolymer was prepared in the same manner as Example 5, except that 4.5 mmol of N-(2-aminoethyl)-3-aminopropyltrimethoxysilane was used in place of 3-glycidyloxypropyl methyldimethoxysilane as the organosilane compound (which is an end-modifying agent). After completion of the reaction, the polymer was treated in the same manner as Example 1. The results of the analysis of the polymer are shown in Table 1 below.

Example 7

A copolymer was prepared in the same manner as Example 5, except that 4.5 mmol of trimethoxysilylpropanethiol was used in place of 3-glycidyloxypropyl methyldimethoxysilane as the organosilane compound (which is an end-modifying agent). After completion of the reaction, the polymer was treated in the same manner as Example 1. The results of the analysis of the polymer are shown in Table 1 below.

Comparative Example 1

A copolymer was prepared in the same manner as Example 1, except that 0.1 mmol of tin tetrachloride which has been widely used as a coupling agent was used in place of α,ω-bis (epoxyethyl)polydimethylsiloxane. After completion of the reaction, the polymer was treated in the same manner as Example 1. The results of the analysis of the polymer are shown in Table 1 below.

Comparative Example 2

A copolymer was prepared in the same manner as Example 1, except that the reaction with α,ω-bis(epoxyethyl)polydimethylsiloxane was carried out, but the process of modifying the end with the silane compound was omitted. After completion of the reaction, the polymer was treated in the same manner as Example 1. The results of the analysis of the polymer are shown in Table 1 below.

Comparative Example 3

A copolymer was prepared in the same manner as Example 1, except that the coupling reaction with the organosiloxane compound was omitted and the process of modifying the end was carried out by adding 5.0 mmol of 3-glycidyloxypropyl methyldimethoxysilane to the living polymer. After completion of the reaction, the polymer was treated in the same manner as Example 1. The results of the analysis of the polymer are shown in Table 1 below.

Comparative Example 4

A copolymer was prepared in the same manner as Example 1, except that 0.13 mmol of tin tetrachloride which has been widely used as a coupling agent was used in place of α,ω-bis (epoxyethyl)polydimethylsiloxane and that the process of modifying the end with the silane compound was omitted. After completion of the reaction, the polymer was treated in the same manner as Example 1. The results of the analysis of the polymer are shown in Table 1 below.

Comparative Example 5

A copolymer was prepared in the same manner as Example 1, except that 0.13 mmol of tetraglycidyl-1,3-bisaminomethylcyclohexane was used in place of α,ω-bis(epoxyethyl) polydimethylsiloxane as the coupling agent. After completion of the reaction, the polymer was treated in the same manner as Example 1. The results of the analysis of the polymer are shown in Table 1 below.

Comparative Example 6

A copolymer was prepared in the same manner as Example 1, except that 0.1 mmol of α,ω-bis(2-dimethylchlorosilylethyl)polydimethylsiloxane was used in place of α,ω-bis(epoxyethyl)polydimethylsiloxane as the coupling agent and that the process of modifying the end with the silane compound was omitted. After completion of the reaction, the polymer was treated in the same manner as Example 1. The results of the analysis of the polymer are shown in Table 1 below.

Comparative Example 7

A copolymer was prepared in the same manner as Example 1, except that the coupling reaction was carried out using tin tetrachloride in place of α,ω-bis(epoxyethyl)polydimethylsiloxane as the coupling agent, and then 4.5 mmol of ethyl amino benzophenone (EBA) was added to the reactor to perform the end-modification reaction. After completion of the reaction, the polymer was treated in the same manner as Example 1. The results of the analysis of the polymer are shown in Table 1 below.

Comparative Example 8

A copolymer was prepared in the same manner as Example 1, except that 4.5 mmol of ethyl amino benzophenone (EBA) was used in place of 3-glycidyloxypropyl methyldimethoxysilane as the organosilane compound (which is an end-modifying agent). After completion of the reaction, the polymer was treated in the same manner as Example 1. The results of the analysis of the polymer are shown in Table 1 below.

Test Examples 100 parts by weight of each of the copolymers obtained in Examples 1 to and Comparative Examples 1 to 8, 80 parts by weight of silica (Z115-GR), 10 parts by weight of aromatic oil (TDAE, H&R Corp.), 6.4 parts by weight of bis-(triethoxysilylpropyl)tetrasulfane (Si-69), 2.0 parts by weight of stearic acid, 3 parts by weight of zinc oxide, 2 parts by weight of 1,3-diphenyl guanidine, 2 parts by weight of N-cyclohexyl-benzothiazyl sulfonamide and 1.6 parts by weight of sulfur were blended with each other in a lab mixer. Also, the compounding processability of each of the blends and the physical and dynamic properties of a specimen prepared from each of the blends were measured, and the results of the measurement are shown in Table 2 below.

Methods for measuring physical properties (1) Hardness: measured by a SHORE-A durometer (2) Tensile strength, 300% modulus and elongation of compounded rubber: measured using a universal test machine (UTM) in accordance with ASTM 3189 Method B.

(3) Dynamic Tan δ value of vulcanized rubber: analyzed using a Rheometric Scientific DMTA 5 at a frequency of 10 Hz with 0.1% strain

TABLE 1

| | | Modifying agent | | Content in backbone structure (wt %)[a] | | Modification ratio (mol %)[b] | | Weight average molecular (×1,000) | Mooney viscosity $(ML_{1+4}, 100°\ C.)$ |
|---|---|---|---|---|---|---|---|---|---|
| | | organosiloxane | organosilane | Styrene | Vinyl | organosiloxane | organosilane | | |
| Ex. | 1 | Epoxy polysiloxane[1] | GTMS[5] | 28 | 55 | 10 | 75 | 249 | 65 |
| | 2 | Epoxy polysiloxane | AEAPTMS[6] | 28 | 54 | 10 | 74 | 239 | 63 |
| | 3 | Epoxy polysiloxane | MTMO[7] | 28 | 55 | 9 | 70 | 235 | 63 |
| | 4 | Epoxy polysiloxane | VTES[8] | 28 | 55 | 11 | 70 | 246 | 64 |
| | 5 | Trichloro polysiloxane[2] | GTMS | 28 | 56 | 13 | 71 | 251 | 65 |
| | 6 | Trichloro polysiloxane | AEAPTMS | 28 | 53 | 12 | 68 | 239 | 61 |
| | 7 | Trichloro polysiloxane | MTMO | 28 | 54 | 11 | 71 | 243 | 64 |
| Comp. Ex. | 1 | $SnCl_4$ | GTMS | 28 | 56 | 0 | 68 | 255 | 64 |
| | 2 | Epoxy polysiloxane | — | 28 | 57 | 13 | 0 | 250 | 64 |
| | 3 | — | GTMS | 28 | 56 | 0 | 75 | 241 | 62 |
| | 4 | $SnCl_4$ | — | 28 | 55 | 0 | 0 | 239 | 62 |
| | 5 | TGBAMC[3] | GTMS | 28 | 56 | 0 | 65 | 251 | 65 |
| | 6 | Polyvalent polysiloxane[4] | — | 28 | 57 | 12 | 0 | 256 | 66 |
| | 7 | $SnCl_4$ | EAB[9] | 28 | 56 | 0 | 0 | 236 | 62 |
| | 8 | Epoxy polysiloxane | EAB | 28 | 57 | 12 | 0 | 238 | 61 |

[a] determined by NMR analysis and indicates the content (wt %) of a styrene or vinyl content in the total components constituting the backbone structure.
[b] determined by GPC analysis and indicates the ratios (mol %) of modification (coupling) with the modifying agents relative to the living polymer.
[1] epoxy polysiloxane: α,ω-bis(epoxyethyl)polydimethylsiloxane
[2] trichloro polysiloxane: α,ω-bis(2-trichlorosilylethyl)polydimethylsiloxane
[3] TGBAMC: tetraglycidyl-1,3-bisaminomethylcyclohexane
[4] polyvalent polysiloxane: α,ω-bis(2-dimethylchlorosilylethyl)polydimethylsiloxane
[5] GTMS: 3-glycidyloxypropyl methyldimethoxysilane
[6] AEAPTMS: N-(2-aminoethyl)-3-aminopropyltrimethoxysilane
[7] MTMO: trimethoxysilylpropanethiol
[8] VTES: vinyl triethoxysilane
[9] EAB: ethyl aminobenzophenone

TABLE 2

|  |  | Money viscosity of compound | Hardness | Tensile strength | 300% modulus | Elongation (%) | Tg (° C.) | tan δ 0° C. | tan δ 66° C. |
|---|---|---|---|---|---|---|---|---|---|
| Ex. | 1 | 129 | 66 | 203 | 155 | 390 | −2.5 | 1.0517 | 0.0705 |
|  | 2 | 124 | 66 | 199 | 153 | 382 | −2.7 | 1.0323 | 0.0732 |
|  | 3 | 124 | 66 | 189 | 146 | 389 | −2.8 | 1.0211 | 0.0726 |
|  | 4 | 125 | 66 | 197 | 148 | 391 | −2.5 | 1.0189 | 0.0742 |
|  | 5 | 129 | 66 | 201 | 152 | 374 | −3.1 | 1.0421 | 0.0711 |
|  | 6 | 122 | 65 | 193 | 148 | 379 | −2.9 | 1.0143 | 0.0729 |
|  | 7 | 127 | 66 | 192 | 139 | 382 | −2.7 | 1.0289 | 0.0753 |
| Comp. Ex. | 1 | 105 | 66 | 159 | 145 | 380 | −3.7 | 0.9891 | 0.0799 |
|  | 2 | 133 | 66 | 186 | 144 | 371 | −3.2 | 0.9458 | 0.0807 |
|  | 3 | 135 | 66 | 190 | 130 | 383 | −3.0 | 0.9748 | 0.0801 |
|  | 4 | 120 | 66 | 165 | 142 | 362 | −3.1 | 0.9450 | 0.0823 |
|  | 5 | 125 | 66 | 183 | 132 | 350 | −3.0 | 0.9881 | 0.0782 |
|  | 6 | 123 | 66 | 195 | 145 | 360 | −2.9 | 0.9558 | 0.0805 |
|  | 7 | 128 | 66 | 187 | 139 | 350 | −3.3 | 0.9113 | 0.0815 |
|  | 8 | 135 | 65 | 194 | 142 | 355 | −3.2 | 0.9382 | 0.0821 |

As can be seen in Table 2 above, the end-modified diene copolymer of the present invention, obtained by modifying the living polymer with the organosiloxane compound and then with the organosilane compound, maintains excellent mechanical properties and processability and has significantly improved dynamic properties such as wet traction and rolling rotation in comparison with conventional copolymers prepared either using a coupling agent of SnCl$_4$ or SiCl$_4$ or by modifying the living polymer once.

As described above, the copolymer of the present invention contains in its structure a plurality of different functional groups that improves compatibility with silica, for example, a polysiloxane group, a hydroxyl group, an epoxy group and the like, and thus has excellent compatibility with silica.

The copolymer of the present invention may be used as a rubber material for silica tires, which maintains excellent mechanical properties such as wear resistance while showing high wet traction and low rolling resistance.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An end-modified diene copolymer wherein a living polymer of either a conjugated diene monomer alone or a mixture of the conjugated diene monomer and a vinyl aromatic monomer is modified with an organosiloxane compound represented by the following formula 1 and with an organosilane compound represented by the following formula 2:

[Formula 1]

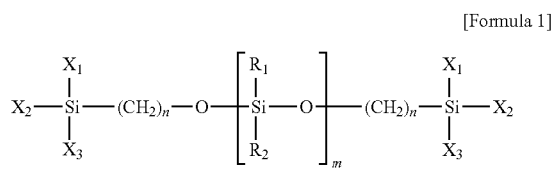

wherein $R_1$ and $R_2$ are the same or different and represent a hydrogen atom or a $C_1$-$C_{20}$ alkyl group; $X_1$, $X_2$ and $X_3$ are the same or different and represent a hydrogen atom, a $C_1$-$C_{20}$ alkyl group, or a reactive group capable of reacting with the end of the living polymer, the reactive group being a halogen atom, a $C_1$-$C_{20}$ alkoxy group, an epoxy group or an epoxy $C_1$-$C_{20}$ alkyl group; at least one of $X_1$, $X_2$ and $X_3$ is a reactive group; n is an integer between 1 and 1000; and m is an integer between 0 and 20;

[Formula 2]

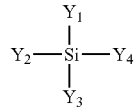

wherein $Y_1$, $Y_2$, $Y_3$ and $Y_4$ are the same or different and represent a $C_1$-$C_{20}$ alkyl group, a $C_1$-$C_{20}$ aminoalkyl group, $NH_2(CH_2)_p$—$NH(CH_2)_q$— wherein p and q are each an integer between 1 and 20, a $C_1$-$C_{20}$ alkylthio group, or a reactive group capable of reacting with the end of the living polymer, the reactive group being a chlorine atom, a $C_2$-$C_{20}$ alkenyl group, a $C_1$-$C_{20}$ alkoxy group, a $C_1$-$C_{20}$ haloalkyl group, an epoxy group, an epoxy $C_1$-$C_{20}$ alkyl group or an epoxy $C_1$-$C_{20}$ alkoxy group.

2. The end-modified diene copolymer of claim 1, wherein the end-modified diene copolymer has a Mooney viscosity [$ML_{1+4}$, 100° C.] of 20-200.

3. The end-modified diene copolymer of claim 1, wherein the ratio of modification with the organosiloxane compound represented by formula 1 is 1-50 mol % based on the moles of the living polymer, and the ratio of modification with the organosilane compound represented by formula 2 is 50-99 mol % based on the moles of the living polymer.

4. The end-modified diene copolymer of claim 1, wherein the conjugated diene monomer is 1,3-butadiene or isoprene.

5. The end-modified diene copolymer of claim 1, wherein the vinyl aromatic monomer is styrene or alpha-methyl styrene.

6. The end-modified diene copolymer of claim 1, wherein the organosiloxane compound represented by formula 1 is one or more selected from the group consisting of α,ω-bis (epoxyethyl)polydimethylsiloxane, α,ω-bis(2-dimethylchlorosilylethyl)polydimethylsiloxane, α,ω-bis(2-trichlorosilylethyl)polydimethylsiloxane, α,ω-bis(2-dichloromethylsilylethyl)polydimethylsiloxane, α,ω-bis(2-dimethylepoxysilylethyl)polydimethylsiloxane, α,ω-bis(2-methyldiepoxysilylethyl)polydimethylsiloxane, α,ω-bis(2-triepoxysilylethyl)polydimethylsiloxane, α,ω-bis(2-methyldimethoxysilylethyl)polydimethylsiloxane, α,ω-bis 7. The end-modified diene copolymer of claim 1, wherein the organosilane compound represented by formula 2 is one or more selected from the group consisting of 3-chloropropyltriethoxysilane, 3-chloropropylmethylethoxysilane, 3-aminopropyltriethoxysilane, N-(2-aminoethyl)-3-aminopropyltrimethoxysilane, 3-aminopropylmethyldiethoxysilane, trimethoxysilylpropanethiol, 3-glycidyloxypropyl methyldiethoxysilane, 3-glycidyloxypropyl triethoxysilane, 3-glycidyloxypropyl methyldimethoxysilane, 3-glycidyloxypropyl trimethoxysilane, and vinyl triethoxysilane.

8. A silica-containing tire composition comprising:
   100 parts by weight of the end-modified diene copolymer according to claim 1;
   10-100 parts by weight of reinforcing silica;
   0.1-5 parts by weight of sulfur; and
   0.1-5 parts by weight of a vulcanization accelerator.

9. A method for preparing an end-modified diene copolymer, the method comprising the steps of:
   polymerizing either a conjugated diene monomer alone or a mixture of the conjugated diene monomer and a vinyl aromatic monomer in the presence of a hydrocarbon solvent, a Lewis case and an organolithium catalyst to obtain a living polymer;
   subjecting the living polymer to a primary modification reaction using an organosiloxane compound represented by the following formula 1 in an amount of 0.01-0.5 moles relative to 1 mole of the living polymer; and
   subjecting the end of the living polymer, which has not been modified with the organosiloxane compound, to a secondary modification reaction using an organosilane compound represented by the following formula 2 in an amount of 0.1-1 mole relative to 1 mole of the living polymer:

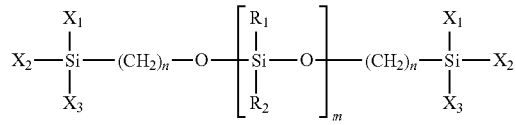

[Formula 1]

wherein $R_1$ and $R_2$ are the same or different and represent a hydrogen atom or a $C_1$-$C_{20}$ alkyl group; $X_1$, $X_2$ and $X_3$ are the same or different and represent a hydrogen atom, a $C_1$-$C_{20}$ alkyl group, or a reactive group capable of reacting with the end of the living polymer, the reactive group being a halogen atom, a $C_1$-$C_{20}$ alkoxy group, an epoxy group or an epoxy $C_1$-$C_{20}$ alkyl group; at least one of $X_1$, $X_2$ and $X_3$ is a reactive group; n is an integer between 1 and 1000; and m is an integer between 0 and 20;

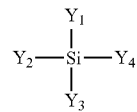

[Formula 2]

wherein $Y_1$, $Y_2$, $Y_3$ and $Y_4$ are the same or different and represent a $C_1$-$C_{20}$ alkyl group, a $C_1$-$C_{20}$ aminoalkyl group, $NH_2(CH_2)_p$—$NH(CH_2)_q$— wherein p and q are each an integer between 1 and 20, a $C_1$-$C_{20}$ alkylthio group, or a reactive group capable of reacting with the end of the living polymer, the reactive group being a chlorine atom, a $C_2$-$C_{20}$ alkenyl group, a $C_1$-$C_{20}$ alkoxy group, a $C_1$-$C_{20}$ haloalkyl group, an epoxy group, an epoxy $C_1$-$C_{20}$ alkyl group or an epoxy $C_1$-$C_{20}$ alkoxy group.

* * * * *